March 20, 1956 M. DEN HERTOG 2,739,186

AUTOMATIC TELEPHONE SWITCHING SYSTEM

Filed April 28, 1952 8 Sheets-Sheet 1

INVENTOR.
MARTINUS DEN HERTOG
BY
Robert Harding Jr
ATTORNEY

March 20, 1956 M. DEN HERTOG 2,739,186

AUTOMATIC TELEPHONE SWITCHING SYSTEM

Filed April 28, 1952 8 Sheets-Sheet 2

INVENTOR.
MARTINUS DEN HERTOG
BY
Robert Harding Jr.
ATTORNEY

March 20, 1956 M. DEN HERTOG 2,739,186

AUTOMATIC TELEPHONE SWITCHING SYSTEM

Filed April 28, 1952 8 Sheets-Sheet 3

INVENTOR.
MARTINUS DEN HERTOG
BY
Robert Harding Jr.
ATTORNEY

March 20, 1956 M. DEN HERTOG 2,739,186
AUTOMATIC TELEPHONE SWITCHING SYSTEM
Filed April 28, 1952 8 Sheets-Sheet 4

INVENTOR.
MARTINUS DEN HERTOG
BY
Robert Harding Jr.
ATTORNEY

March 20, 1956 M. DEN HERTOG 2,739,186

AUTOMATIC TELEPHONE SWITCHING SYSTEM

Filed April 28, 1952 8 Sheets-Sheet 5

INVENTOR.
MARTINUS DEN HERTOG
BY
Robert Harding Jr.
ATTORNEY

March 20, 1956 M. DEN HERTOG 2,739,186

AUTOMATIC TELEPHONE SWITCHING SYSTEM

Filed April 28, 1952 8 Sheets-Sheet 6

INVENTOR.
MARTINUS DEN HERTOG
BY
Robert Harding Jr.
ATTORNEY

March 20, 1956 M. DEN HERTOG 2,739,186

AUTOMATIC TELEPHONE SWITCHING SYSTEM

Filed April 28, 1952 8 Sheets-Sheet 7

INVENTOR.
MARTINUS DEN HERTOG
BY
Robert Harding Jr.
ATTORNEY

INVENTOR.
MARTINUS DEN HERTOG
BY Robert Harding Jr.
ATTORNEY 2,739,186

AUTOMATIC TELEPHONE SWITCHING SYSTEM

Martinus Den Hertog, Antwerp, Belgium, assignor to International Standard Electric Corporation, New York, N. Y., a corporation of Delaware Application April 28, 1952, Serial No. 284,785

Claims priority, application Netherlands October 30, 1947

12 Claims. (Cl. 179—18)

The present invention relates to a switching system in which multi-switches are used for establishing connections in line finder and/or final selector stages. The object of the invention is to provide an effiicent and economical circuit arrangement for controlling these switches.

This application is a continuation-in-part of my patent application, Serial No. 54,674, filed on October 15, 1948, now abandoned.

Switches of the multi-selector type, such as may be used herewith, have been described in the U. S. patent application of J. Kruithof, Serial No. 14,215, filed on March 11, 1948, and corresponding to British Patent No. 658,295, issued on January 16, 1952. A circuit arrangement in which such switches are used for group selector stages in a switching system has been described in the U. S. patent application of J. Kruithof, Serial No. 18,865, filed on April 5, 1948, and corresponding to British Patent No. 661,884, issued on September 19, 1952.

In the system to be described hereafter, the multi-switches may each consist of a plurality of individual switches and of a common equipment, with which a common control circuit is associated, which together may perform a selecting and/or hunting action on behalf of one or more of these individual switches simultaneously. In accordance with the main feature of the invention, the line finders and/or final selectors are arranged as multi-switches, the common equipment and the common control circuit associated therewith being operative to control both kinds of switches.

Before the test for the free or busy condition of a wanted line takes place, in accordance with another feature of the invention, the register controlling the connection may check the potential appearing at a point in the common circuit, so that, if more than one call to the same line occurs at the same time and a plurality of registers simultaneously carry out this potential check, one register obtains preference for testing the wanted line and the other registers are temporarily excluded.

If a plurality of calls are simultaneously directed to a P. B. X group, the various registers controlling the several connections carry out the line test one at a time. Means are then provided in the common circuit such that if the common equipment has already carried out a test on behalf of a preceding call in the same group and consequently has already tested and left the first P. B. X line, the test condition applied to the now operative register when testing a subsequent line is modified so as to characterize that line as a first P. B. X line, except in the case when that line is a last P. B. X line.

In accordance with the invention, the means for effecting this modification in the common control circuit may consist of a potentiometer so arranged as to provide a potential corresponding to the potential present on the test conductor of a busy first P. B. X line. Said potential is connected to the test conductor of the line under test via a rectifier so poled that each time another register tries to seize a line other than the first line in a P. B. X group, the potentials on free lines and also on the last line of the P. B. X group, if it is busy, are not influenced thereby, whereas the potential of a busy intermediate line is brought to the value prevailing on a busy first line.

In a multi-switch in accordance with the invention, some of the individual switches may be arranged as line finders and others as final selectors. For each of said two types of switches, separate test potentials have been provided in the common control circuit, which a register must check before it can obtain preference for carrying out a line test.

If simultaneous attempts to test one and the same line are made by one or more line finders and by one or more final selectors, preference is given to one of these two kinds of switch, the test potential provided in the common control circuit for one kind of switch being disabled as soon as a check on the test potential provided for the other kind of switch takes place.

The invention will be described with reference to the accompanying drawings, in which one embodiment has been schematically shown, including a line finder, and a final selector, together with common devices contributing to the control of these switches, and such parts of a register as are necessary for a thorough understanding of the invention.

Fig. 1 represents a part of a multi-switch and other apparatus, which together are used as a line finder. In a portion of this drawing, a subscriber line circuit SLC, of the "relayless" type disclosed and fully described in my U. S. patent application Serial No. 726,358, filed February 4, 1947, now abandoned, and corresponding to British Patent No. 641,819, issued December 6, 1950, has been shown. The finder starting circuit represented by the rectangle FSC may comprise the devices disclosed in Fig. 2 of that patent.

Fig. 2 represents another part of the same multi-switch and other apparatus, which together are used as a final selector.

The vertical lines L1 to L5 appearing in both Figs. 1 and 2 represent the multiple conductors of the multi-switch, to which the switch-outlets (in this case the subscriber line circuits) are connected and which are provided in common for all individual switches of the multi-switch.

Figure 2:
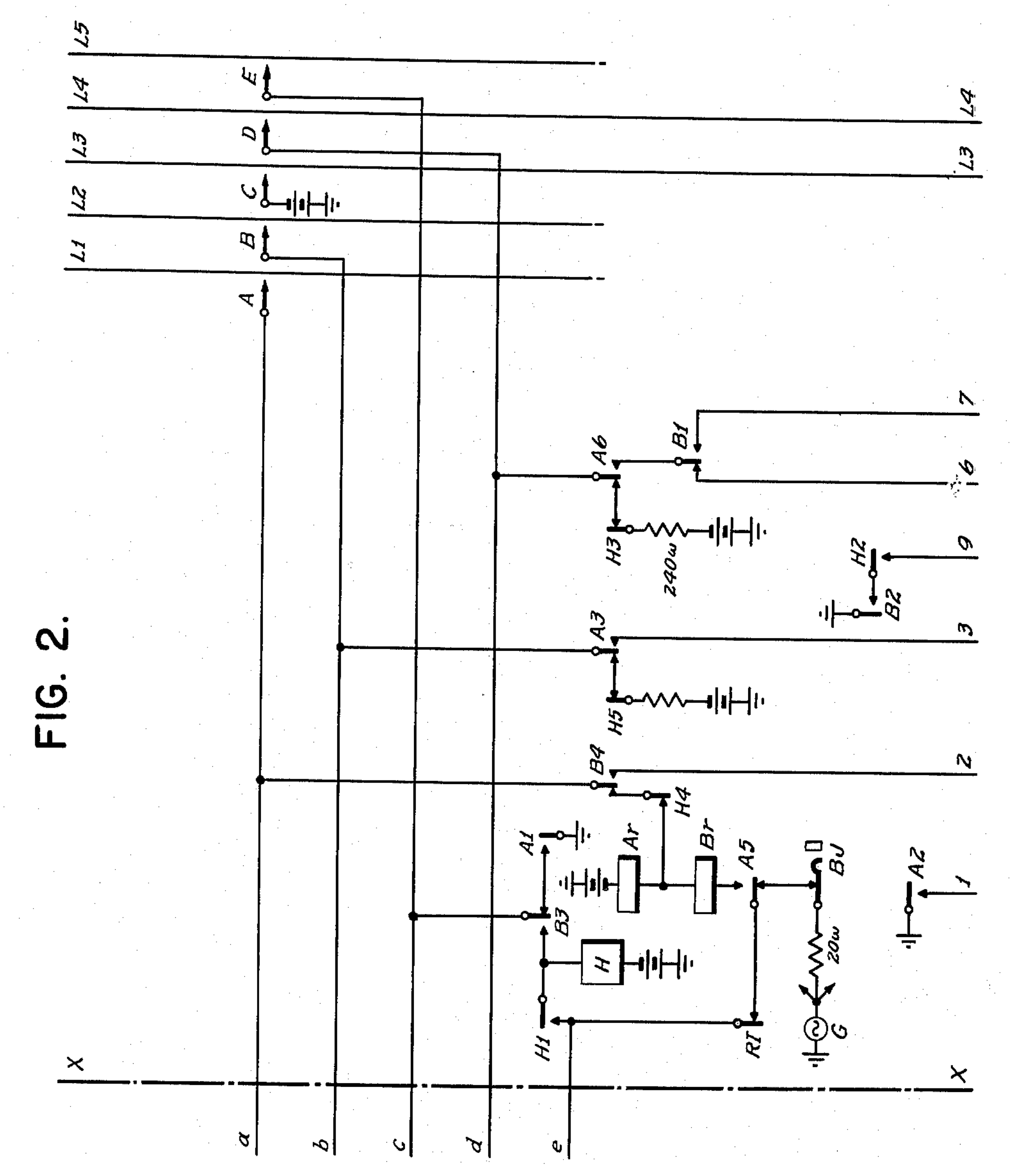
Figure 5A:
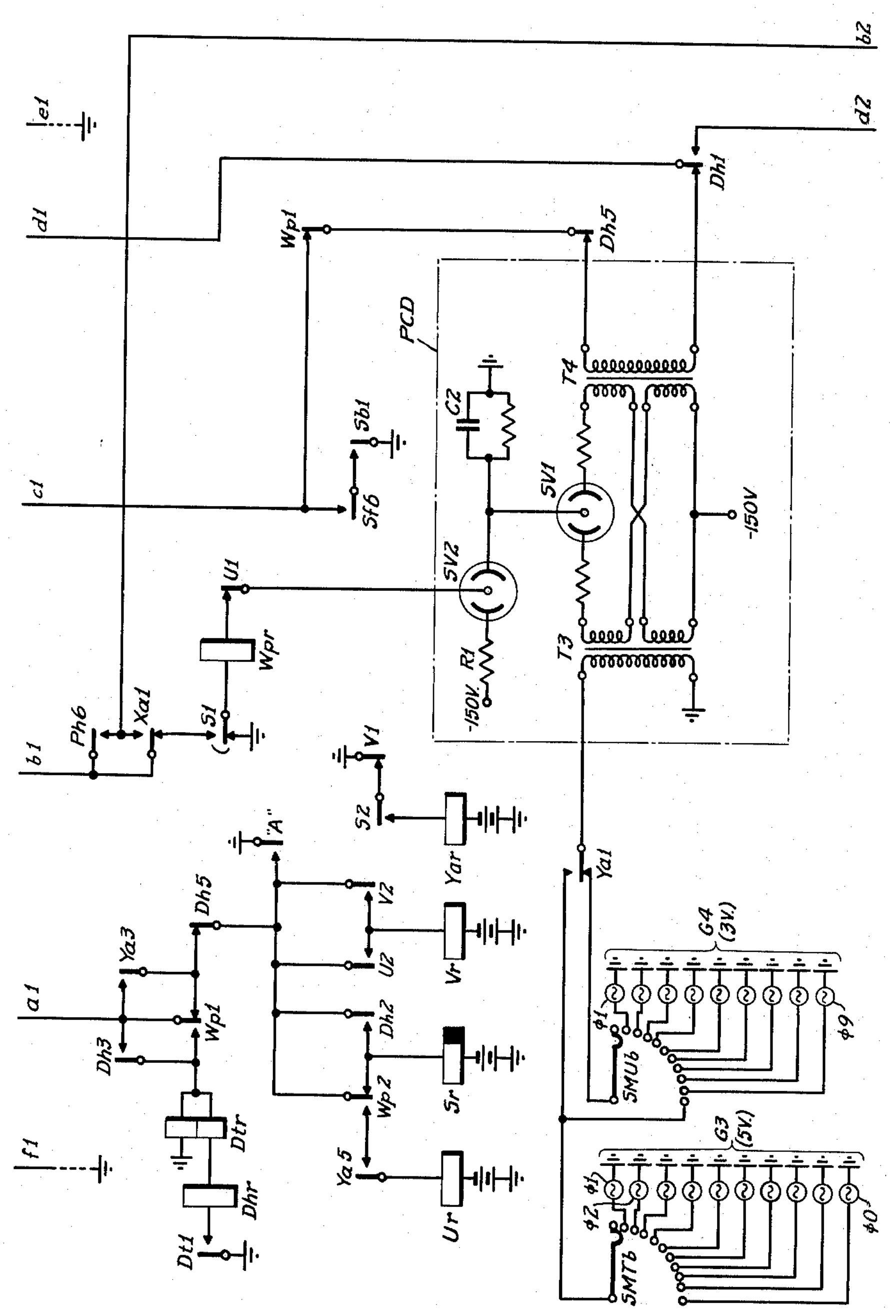
Figure 5B:
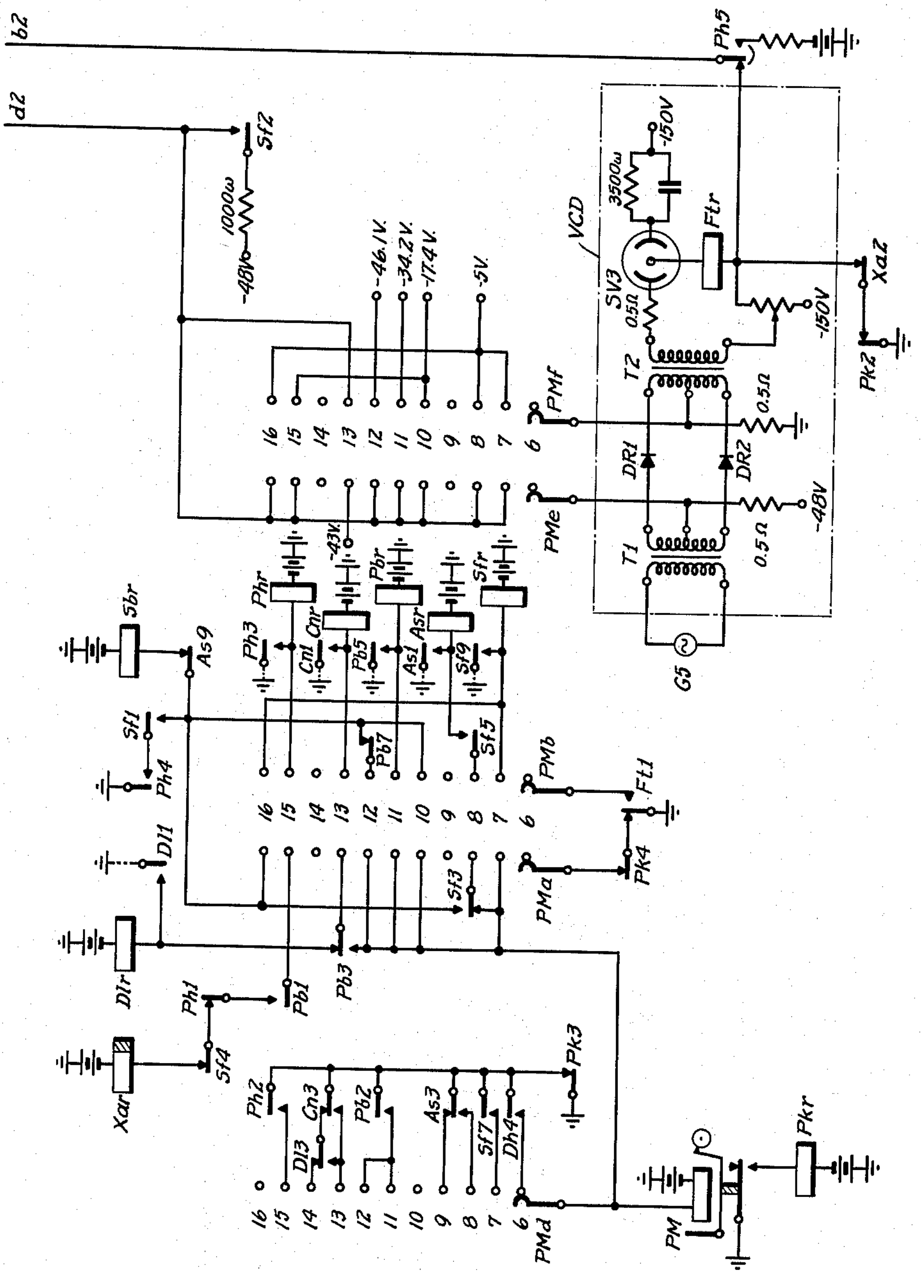

Figs. 5A and 5B, when juxtaposed one above the other, represent a part of a register suitable for use with the final selector shown in Fig. 2.

Figure 1:
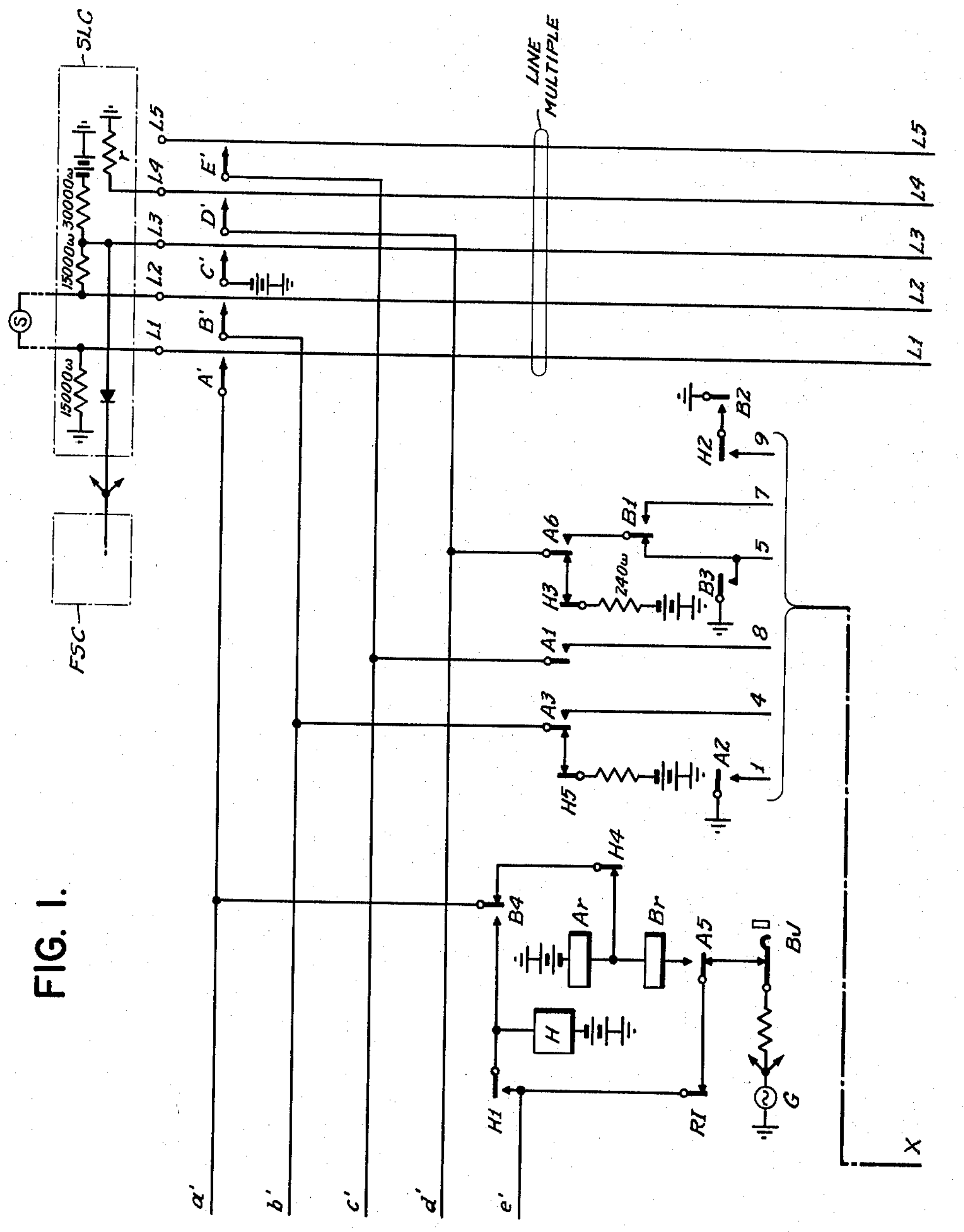
Figure 4:
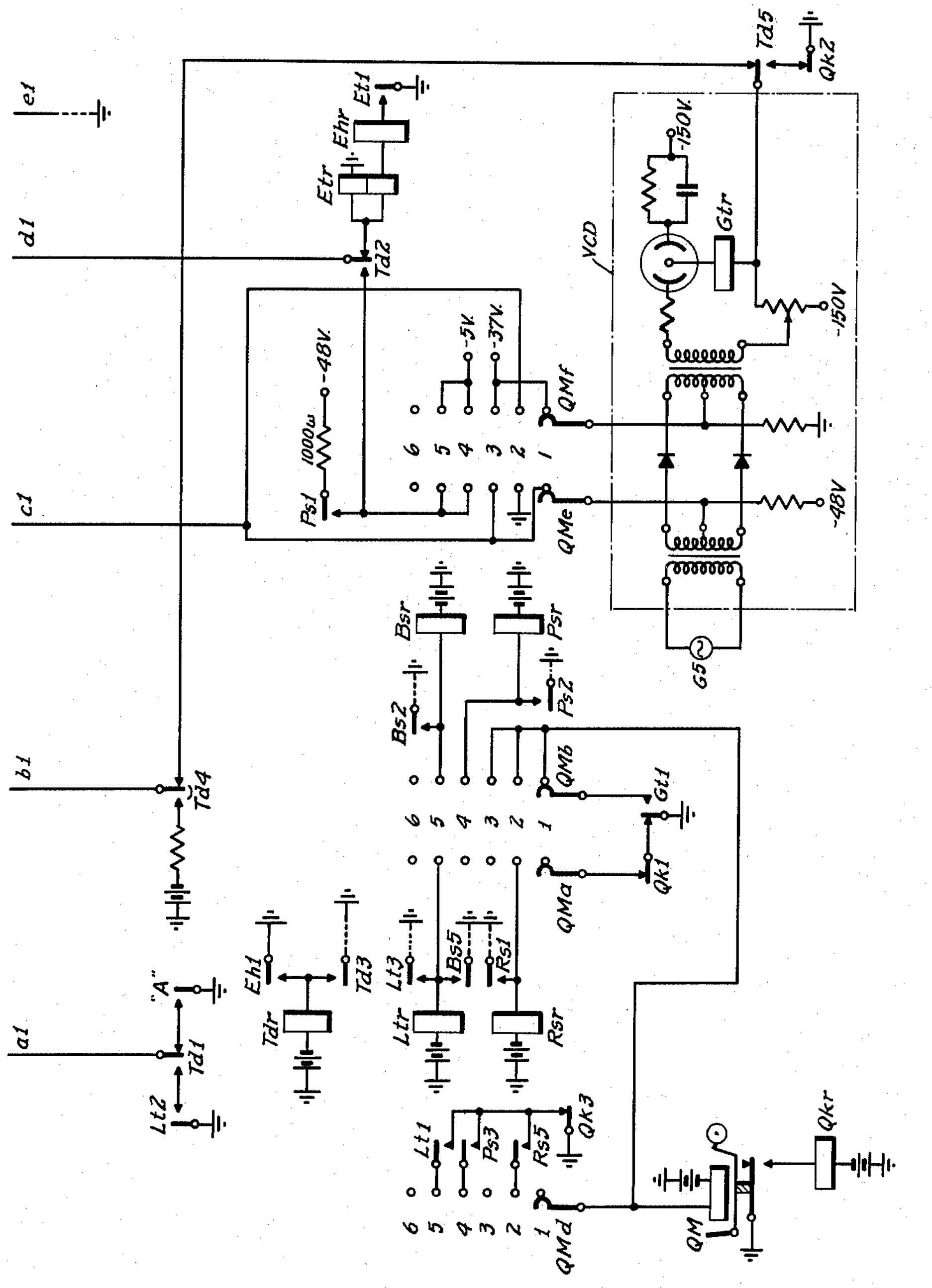
Fig. 4 represents a part of a digit-registering and multi-switch controlling circuit, hereafter referred to as a register, suitable for use with the line finder shown in Fig. 1.
Figure 6:
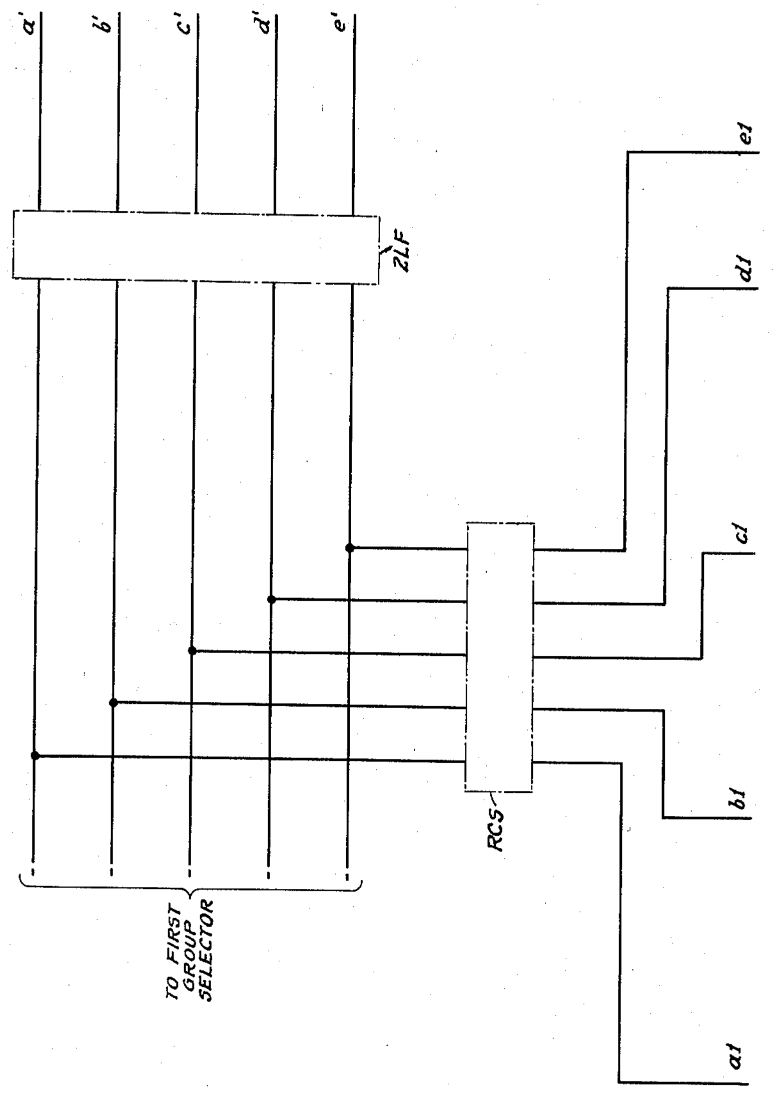

Fig. 6 shows, in block diagram form, switching equipment used to connect the register shown in Fig. 4 to the line finder shown in Fig. 1.

Figure 7:
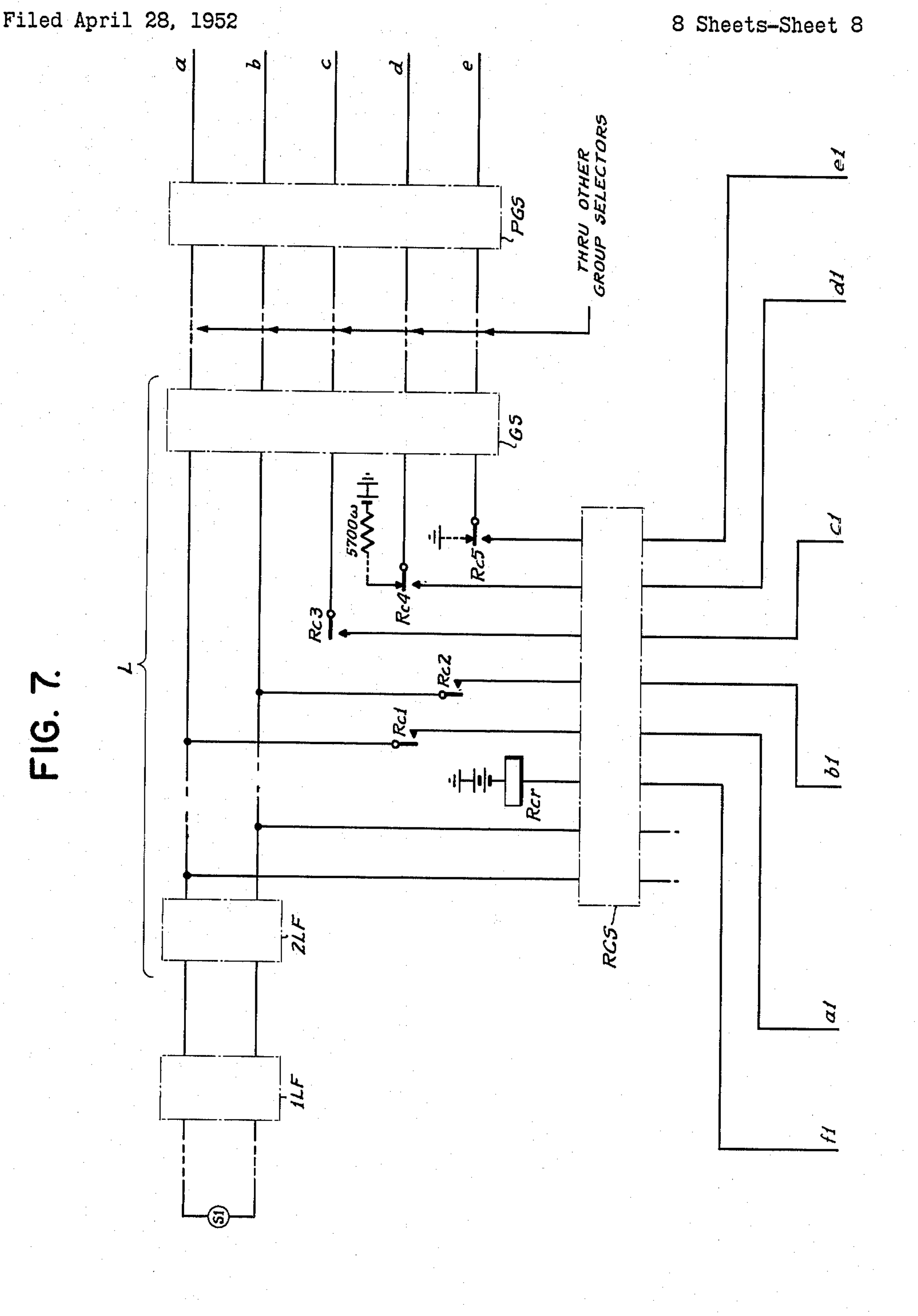

Fig. 7 shows, also partly in block diagram form, switching equipment used to connect the register shown in Figs. 5A and 5B to the final selector shown in Fig. 2.

Figures 3, 8, 9:
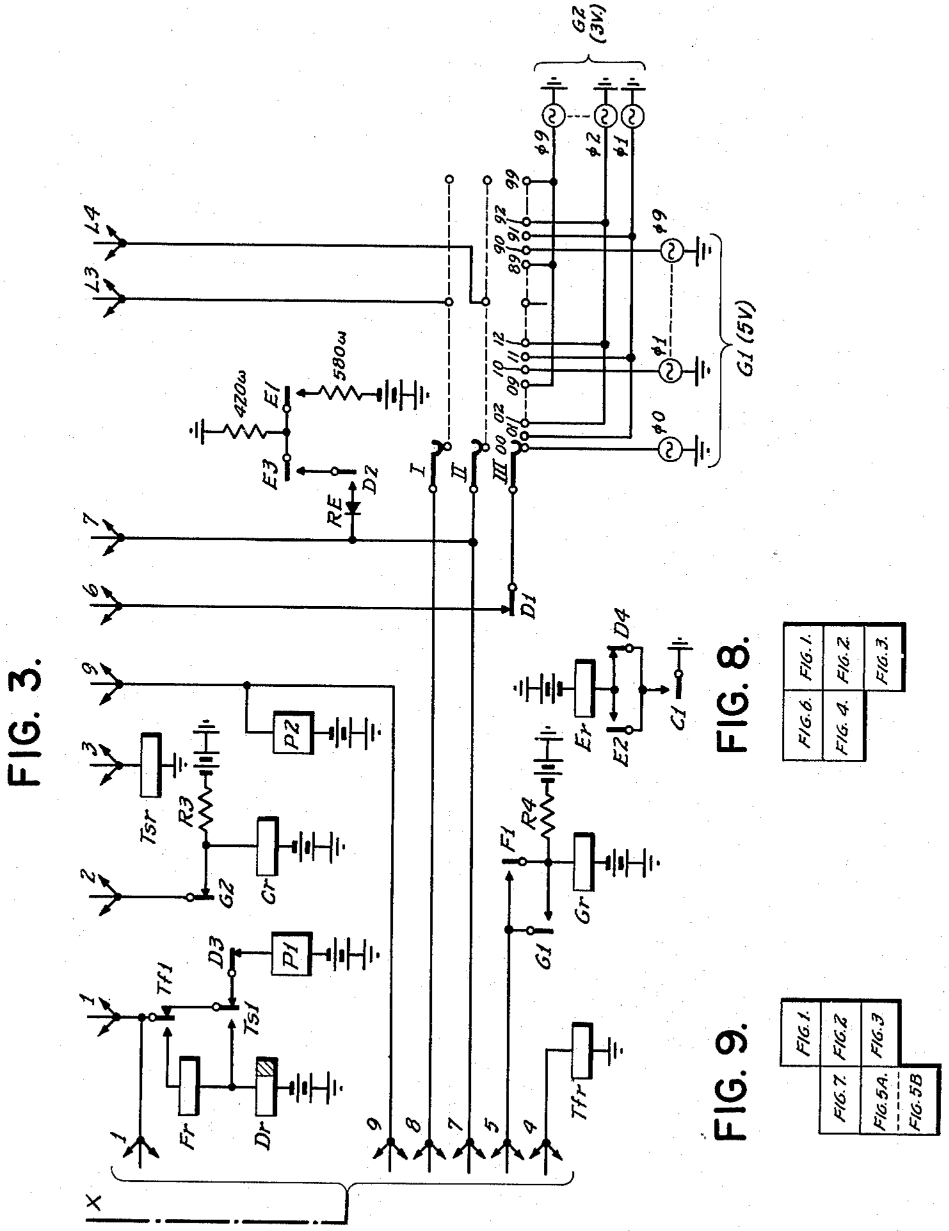
Fig. 3 represents that part of the multi-switch which is common to, and which together with relays and other apparatus shown in the drawing is used to control the setting of the individual switches of the multi-switch shown in Figs. 1 and 2 and other similar individual switches not shown in the drawings.

Figs. 8 and 9 illustrate the manner in which the drawings are to be juxtaposed for a complete understanding of the invention.

A multi-switch of the type used in the embodiment of the invention being described may comprise line finders exclusively, final selectors exclusively or any desired combination of line finders and final selectors.

If a multi-switch is used exclusively for line finders, each individual line finder including a part thereof is connected to the common part of the multi-switch shown in Fig. 3 by six conductors numbered 1, 4, 5, 7, 8 and 9, respectively, as shown in both Fig. 1 and Fig. 3.

If a multi-switch is used exclusively for final selectors, each individual final selector including a part thereof is likewise connected to the common part of the multi-switch by six conductors numbered 1, 2, 3, 6, 7, and 9, respectively, as shown in both Fig. 2 and Fig. 3.

If one multi-switch is used both for line finders and for final selectors, each line finder and each final selector is connected to the same common part by a set of six conductors, numbered as indicated above. From this it will be evident that some conductors, namely conductors 1, 7 and 9, are common to both line finders and final selectors, while conductors 2, 3 and 6 are exclusively used in connection with final selectors, and conductors 4, 5 and 8 are exclusively used in connection with line finders.

The setting of a final selector, such as that shown in Fig. 2, upon the terminals of a wanted subscriber line, in cooperation with the common control circuit shown in Fig. 3 and part of the register shown in Figs. 5A and 5B, will now be described. For a proper understanding of the drawings, Figs. 1, 2, 3, 5A, 5B and 7 are to be juxtaposed as indicated in Fig 9.

It is to be understood that, prior to the operations to be described, a calling subscriber at station S1 (Fig. 7), upon originating a call, has become connected, through a first line finder 1LF, through a second line finder 2LF forming part of a link L comprising also a first group selector GS and a relay R*cr*, and through a register connecting switch RCS, to a register of which part is shown in Figs. 5A and 5B; also that the said subscriber has already dialed sufficient digits of the wanted subscriber line number to cause said register to operate relay R*cr*, by connecting ground to conductor *f*1, and to extend a 5-wire connection from conductors *a*1—*e*1, via switch RCS (Fig. 7), make contacts R*c*1—R*c*5, selector GS, intermediate group selectors if necessary, and selector PGS, to conductors *a*—*e* of the final selector shown in Fig. 2, all in any well-known manner which will not be further described.

The final selector is seized by the said selector PGS in the manner described in the above-mentioned British Patent No. 661,884. Like the group selector shown in Fig. 7 of the latter, a disengaged final selector, according to the present invention, is characterized by the presence of an alternating current potential, of frequency, phase and voltage characteristic of the group to which the final selector belongs, on one of the conductors connected to the said selector PGS and by the presence also of a direct current potential on another of said conductors. The alternating current potential on conductor *e* (Fig. 2) can be traced via break contacts RI and A5, break contact of busy jack BJ, 20*w* resistor, to the grounded A. C. generator G; and the D. C. potential on conductor *d*, via break contacts A6 and H3, 240*w* resistor, to the —48 v. exchange battery.

When the final selector has been seized in this manner and the register controlling the connection is ready to start the setting thereof, that is, when the register has received and stored the remaining digital information as to the identity of the wanted subscriber line, in particular when the tens digit and the units digit have been stored therein, the register closes a contact indicated at "A" (Fig. 5A), by means not shown. This causes the operation of relay A*r* in the final selector which has been seized, in a circuit from ground, via contact "A," break contacts D*h*5 and W*p*1, conductor *a*1, register-connecting switch RCS (Fig. 7), make contact R*c*1, first group selector GS, penultimate group selector PGS, conductor *a*, break contacts B4 and H4 (Fig. 2), relay A*r* to battery. Relay A*r* locks via relay B*r*, make contact A5, contact RI, conductor *e*, through selectors PGS and GS (Fig. 7), make contact R*c*5, through switch RCS, conductor *e*1, to ground (Fig. 5A): relay B*r*, being short-circuited, does not operate at this stage. Also, the closure of said contact "A" causes the operation of the slow-to-release relay S*r* in a circuit via contact "A" and break contact W*p*2, followed by the operation of relay Y*ar* in a circuit via break contact V1 and make contact S2. The digit storing in the register can be effected, for example, in the manner described in U. S. Patent No. 2,454,809 issued on November 30, 1948, wherein the recording is made on step-by-step switches. The wipers and cooperating terminal banks of two step-by-step switches SMT and SMU, such as those similarly designated in that patent and provided for storing the tens and units digits, respectively, have been represented in Fig. 5A and SMT*b* and SMU*b*; the wipers are accordingly to be understood as having taken up positions on their banks which correspond to the tens and units digits, respectively, of the wanted line number.

In the final selector, relay A*r* closes ground at make contact A2 to conductor 1, thereby energizing the power magnet P1 in the common control circuit (Fig. 3), in a circuit via break contacts T*f*1, T*s*1 and D3. As described in the above mentioned British Patent No. 661, 884, the energization of the power magnet P1 causes the rotor or "carriage" of the multi-switch to rotate and the wipers I, II and III driven thereby pass over bank terminals connected to the line circuits of the various subscriber lines to which the multi-switch gives access.

On the several terminals in the bank traversed by wiper III, different potentials are permanently impressed, which potentials are characteristic of the identities of the lines to which said terminals correspond. At the beginning of each group of ten subscriber lines of which the numbers have the same tens digit, an A. C. potential of 5 v. amplitude at 450 cycles is impressed; for each such group of ten lines the potential has the same voltage and frequency but differs in phase. Thus, the first terminal of the group corresponding to the lines numbered 00–09 is connected to a grounded source G1 producing a potential at phase No. 0, designated $\phi 0$ in Fig. 3; this terminal may, for example, be that corresponding to line No. 00 and is so designated on the drawing. Similarly, the first terminal of the group corresponding to the lines numbered 10–19, for example, the terminal of line No. 10, is connected to a source G1 generating a potential at phase No. 1, designated $\phi 1$; other terminals are to be understood to be connected to sources G1 producing potentials at other phases.

Also, the intervening terminals of each group, that is, the terminals between successive first terminals, are connected to other grounded sources G2 in such a way that an A. C. potential of 3 v. amplitude at 450 cycles is impressed thereon; the terminals of all lines whose numbers have the same units digit, but in different groups of tens, are connected together and to one source, but for lines whose numbers have different units digits the impressed potentials differ in phase. Thus, the terminals of those lines whose numbers have the units digit 1 are connected to a source generating a potential at phase No. 1, designated $\phi 1$ in Fig. 3; the remaining intervening terminals are to be understood to be connected to sources G2 producing potentials at other phases.

Whilst the carriage of the multi-switch is rotating, wiper III is connected to the primary winding of transformer T4 in a phase comparing device PCD in the register (Fig. 5A), in a circuit from wiper III, break contact D1, conductor 6, break contact B1 (Fig. 2), make contact A6, conductor *d*, through selectors PGS and GS (Fig. 7), make contact R*c*4, through switch RCS, conductor *d*1, break contact D*h*1 (Fig. 5A), winding of transformer T4, break contacts D*h*6 and W*p*3, conductor *c*1, through switch RCS (Fig. 7), make contact R*c*3, through selectors GS and PGS, conductor *c*, break contact B3 (Fig. 2), make contact A1, to ground; the A. C. potentials at varying voltages and phases encountered by wiper III are thus impressed in turn on the primary winding of transformer T4.

At the same time, an A. C. potential, also of 5 v. amplitude at 450 cycles, is impressed on the primary winding of transformer T3 of device PCD (Fig. 5A), in a circuit from one of the grounded sources G3, via the bank terminal and wiper SMT*b*, make contact Y*a*1, winding of transformer T3, to ground. The ten sources G3, connected to the bank terminals SMT*b*, produce potentials at different phases; for example, the source designated $\phi0$ produces a potential at phase No. 0 which is in phase with the output of the source G1 (Fig. 3), similarly designated; in fact, the several sources G3 are preferably the same as the corresponding sources G1.

Thus, depending upon the position previously taken up by wiper SMT*b*, the voltage, frequency and phase of the reference potential impressed on the primary winding of transformer T3 are the same as those of the potential permanently impressed on the first terminal of the group of ten lines including the wanted line in the path of wiper III (Fig. 3); it is, therefore, desired to stop the rotation of the carriage of the multi-switch when said wiper III reaches said terminal, that is, when the potential impressed thereon matches the potential selected by wiper SMT*b*. For this purpose the phase comparing device PCD is used.

This device is disclosed and fully described in United States Patent No. 2,633,557, issued on March 31, 1953, in which it is explained that whenever two A. C. potentials differing in at least one electrical characteristic, such as voltage, frequency or phase, are impressed respectively on the primary windings of transformers T3 and T4, a situation which occurs when wiper III is passing terminals other than the above mentioned first terminal, gas tube SV1 delivers a pulsating direct current to condenser C2 and gas tube SV2 remains de-ionized. On the other hand, when the electrical characteristics of the two potentials are the same, the pulsating D. C. ceases, condenser C2 discharges and gas tube SV2 ionizes.

When, therefore, wiper III reaches the first terminal of the group of ten lines including the wanted line, the device PCD reacts, tube SV2 ionizes and relays W*pr* (Fig. 5A) and T*sr* (Fig. 3) operate, in a circuit from −150 v., via resistor R1 (Fig. 5A) the main discharge gap of tube SV2, break contact U1, relay W*pr*, make contact S1, break contact X*a*1, conductor *b*1, through switch RCS (Fig. 7), make contact R*c*2, through selectors GS and PGS, conductor *b*, make contact A3, conductor 3, relay T*sr*, to ground.

Relay T*sr* causes the de-energization of the power magnet P1 at its break contact T*s*1, rotation of the carriage of the multi-switch ceases and relay D*r* operates, in a circuit via make contact T*s*1, break contact T*f*1, conductor 1, make contact A2, to ground. Relay W*pr* upon operating opens, at break contact W*p*2, the circuit for relay S*r* which, however, does not restore immediately since it is a slow-to-release relay. At the same time, at make contact W*p*2, a circuit is closed for relay U*r*, via make contact Y*a*5. Relay U*r* operates and causes the energization of relay V*r*, via make contact U2; relay V*r* operates and locks to ground at contact "A," via its make contact V2, and also opens the circuit for relay Y*ar* at break contact V1; relay Y*ar* restores.

Relay U*r* upon opening its break contact U1 also causes the de-energization of relays W*pr* and T*sr*; tube SV2 de-ionizes and the phase comparing device PCD has returned to its normal condition in readiness to perform another comparison. As soon as relay W*pr* restores, the operating circuit for relay S*r* is re-established at break contact W*p*2 and, as this contact has been opened for a very short period, relay S*r* remains operated. The circuit for relay U*r* is opened again at make contact W*p*2; relay U*r* restores, preparing again at break contact U1 the circuit for relays W*pr* and T*sr* so that these relays can operate once more when the device PCD reacts again. It is to be note that relay W*pr* restores before relay Y*ar* restores and that in consequence make contact Y*a*3 maintains the connection of ground to conductor *a*1 whilst break contact W*p*1 is open. Relay Y*ar*, upon changing over its contact Y*a*1, transfers the primary winding of transformer T3 from wiper SMT*b* to wiper SMU*b*, thereby impressing on said winding an A. C. potential of 3 v. amplitude (instead of 5 v.) at 450 cycles from one of the grounded sources G4, depending upon the position previously taken up by wiper SMU*b* (except in the event that wiper SMU*b* has taken up a position on the last terminal on the bank, because the units digit of the wanted subscriber line number is 0, in which case the reference potential remains unchanged). The nine sources G4 connected to the bank terminals SMU*b* produce potentials at different phases; for example, the source designated $\phi1$ produces a potential at phase No. 1 which is in phase with the output of the sources G2 (Fig. 3), similarly designated; in fact, the several sources G4 are preferably the same as the corresponding sources G2.

When relay T*sr* (Fig. 3) restores, it opens the circuit for the slow-to-release relay D*r* at make contact T*s*1 and prepares again the operating circuit for power magnet P1 at break contact T*s*1. However, this magnet will not be energized again until after relay D*r* has restored, since its operating circuit includes also break contact D3. The delay allows time for relay U*r* to prepare again the circuit for relays W*pr* and T*sr* in the register and for relay Y*ar* to change the reference potential impressed on transformer T3, as already described.

Accordingly, the carriage of the multi-switch begins to rotate again as soon as break contact D3 closes; it is desired to stop the rotation when wiper III reaches a terminal within the group of ten terminals in which it has previously stopped and characterized by a potential matching the reference potential selected by wiper SMU*b* in the register, that is, when wiper III reaches the terminal of the wanted subscriber line. When this occurs, the potential encountered by wiper III is conveyed, as previously described, to the register and is impressed on transformer T4 of device PCD; since the reference potential impressed on transformer T3 is now the same in voltage, frequency and phase, the device PCD reacts once more, tube SV2 ionizes and relays W*pr* and T*sr* operate as before. Relay T*sr* opens the circuit for power magnet P1 at break contact T*s*1 and rotation of the carriage ceases; relay D*r* operates as before.

It is to be noted that if the units digit in the number of the wanted line is 0, the reference potential impressed on transformer T3 is still a 5 v. potential at a phase corresponding to the tens digit selected by wiper SMT*b*, as explained; in this event wiper III is already standing on a terminal characterized by the same potential and the device PCD reacts immediately, causing relay T*sr* to operate again before the circuit for power magnet P1 is re-closed; wiper III accordingly remains on said terminal which is, of course, the terminal of the wanted subscriber line.

Relay W*pr* upon operating disconnects ground from conductor *a*1 (Fig. 5A) at break contact W*p*1, thus opening the short-circuit on relay B*r* (Fig. 2); the latter now operates in series with relay A*r*, in the circuit previously traced, shunted by the grounded high-resistance winding of relay D*tr* (Fig. 5A) which is now connected to conductor *a*1 at make contact W*p*1. Relay W*pr* also opens the circuit for relay S*r* at break contacts W*p*2 and relay S*r* again tends to restore.

It is to be observed at this stage that at no time during the operations which have been described of the common control circuit (Fig. 3), in cooperation with one of the plurality of final selectors (Fig. 2) with which it is associated and a register (Figs. 5A and 5B), has any circuit change taken place in said common control circuit which would render it unavailable for use; at the same time, in cooperation with another or several others of said final selectors or, indeed, with one or more line finders (Fig. 1), the operation of which will be described later. In fact, there is nothing to prevent another final selector under the control of another register, from simultaneously or concurrently placing ground on common point 1 (Fig. 3) to energize power magnet P1, nor from extending conductor 6 to said other register in order to scrutinize the potential encountered by wiper III, nor from extending a circuit from said other register to common point 3 in order to operate relay Tsr to de-energize power magnet P1. Should such a situation arise, it will be clear that any one of several registers, concurrently connected to the same common control circuit, can stop the rotation of the carriage of the multi-selector when wiper III encounters a potential which matches the reference potential in said one register, and that the remaining registers will simply wait until said one register allows the carriage to proceed, after which the common control circuit will continue to operate under their joint control.

The situation, then, in the connection under consideration, is that wiper III of the multi-switch has been placed under the control of the register taken into use for that connection, on the terminal of the subscriber line to which the final selector seized by said register is to be directed, but that there may be other final selectors and/or line finders, with their associated registers, connected also to the same common control circuit and jointly and concurrently controlling the carriage of the multi-selector. The next stage in the setting of the final selector under consideration involves the determination by the register of the condition, that is, free or busy, and the class, that is, individual line or first, intermediate or last line of a P. B. X group, of the wanted subscrber line. During this operation, for which another common wiper, wiper II, is provided on the carriage of the multi-selector, it is undesirable that two registers should scrutinize said line at the same time; arrangements are, therefore, provided whereby the common control circuit is placed momentarily under the sole control of one register to the exclusion of any others that may at the moment be connected thereto, as will now be described.

When relay Br (Fig. 2) operates, as described, it disconnects conductor *a* from relay Ar at break contact B4 and connects it instead, via conductor 2, break contact G2 (Fig. 3), relay Cr and resistor R3 in parallel, to battery; in the register (Fig. 5A), ground through the high-resistance winding of relay Dtr has already been connected to conductor *a*1, leading through Fig. 7 to said conductor *a*, as also described. Relay Dtr accordingly operates in series with resistor R3 and at make contact Dt1 connects ground through low-resistance relay Dhr and the low-resistance winding of relay Dtr in parallel with the high-resistance winding of relay Dtr, thus lowering the D. C. potential at common point 2 (Fig. 3) and operating relay Cr which, however, has no immediate effect.

Should two or more registers reach the same stage of operation at the same time and each present its relay Dtr to common point 2, two or more relays Dtr will operate in parallel, but only one can hold to the lowered potential at said common point 2 which results from the closure of their make contacts Dt1; the other relay or relays Dtr will restore and await a later opportunity to operate, leaving the common control circuit under the exclusive control of the register in which relay Dtr is still operated, for example, the register under consideration, in which relay Dhr now operates. The lowered potential at common point 2 serves also to prevent a relay Dtr in any other register, arriving subsequently at the line-testing stage, from operating during the momentary period of exclusion. The operation of said relay Dhr initiates the line-testing operations in the successful register and since only one relay Dhr can be operated at a time, it follows that no other register can interfere with said operations.

When, therefore, relay Dhr operates, it locks at make contact Dh3 to conductor *a*1, independently of make contact Wp1, and at make contact Dh2 it closes another circuit for relay Sr, which accordingly remains operated despite the open break contact Wp2.

It is to be noted that, had Dhr not operated at this stage, due to the register under consideration being excluded by another register, as described above, relay Sr would have restored after a short delay and at its contact S1 would have disconnected relay Wpr from conductor *b*1 and from relay Tsr (Fig. 3), thus leaving the latter under the sole control of said other register, and would have connected relay Wpr directly to ground, thus maintaining it operated and tube SV2 conducting, until such time as the progress of the connection could continue.

Relay Dhr 5 upon operating also disconnects contact "A" from conductor *a*1 at break contact Dh5, so that relays Dtr and Dhr shall not be short-circuited when relay Wpr subsequently restores; at break contacts Dh6 and Dh1 the primary winding of transformer T4 is disconnected from conductors *c*1 and *d*1, respectively, and at make contact Dh1 conductor *d*1 is extended to selected bank terminals of a step-by-step sequence switch shown in Fig. 5B. This switch is provided with an operating magnet PM whose armature, upon restoring after being attracted, advances five wipers PM*a*, PM*b*, PM*d*, PM*e* and PM*f* step by step over a like number of rows of bank terminals. It is to be understood that previous operations carried out in the register have caused these wipers to advance to their positions 6, as shown. Accordingly, magnet PM is energized, in a circuit from battery, magnet PM, wiper PM*d* standing on terminal 6, make contact Dh4, break contact Pk3, to ground; relay Pkr operates to ground on the now closed interrupter contact of magnet PM and opens the circuit of the latter at break contact Pk3; magnet PM restores, advancing the wipers one step to position 7 and releasing relay Pkr. In position 7 and subsequent positions of the switch, a succession of tests to determine the condition and class of the wanted line is made with the aid of a voltage comparing device VCD.

This device is disclosed and fully described in my U. S. Patent No. 2,593,418, issued on April 22, 1952, and operates briefly as follows. The mid-point of the secondary winding of a transformer T1 is connected through a high resistance, such as 500,000 w., to a D. C. potential of −48 v. and also to wiper PM*e* of the sequence switch; the mid-point of the primary winding of another transformer T2 is similarly connected through a high resistance to ground and also to wiper PM*f*; the said transformer windings are connected together through a "gate" comprising rectifier elements DR1 and DR2, so poled as to present a very high resistance when the D. C. potential at wiper PM*e* is negative with respect to that at wiper PM*f*, the situation which obtains in the idle condition of device VCD; the primary winding of transformer T1 is connected to a generator of alternating current at a frequency of, for example, 450 cycles; and the secondary winding of transformer T2 is connected to a gas discharge tube SV3, which remains de-ionized so long as rectifiers DR1, DR2, are presenting a high resistance. Whenever the potential at wiper PM*e* is positive with respect to that at wiper PM*f*, the said rectifiers present a lower resistance and "open the gate"; the A. C. voltage at the secondary winding of transformer T2 then rises to a value sufficient to cause tube SV3 to ionize, whereupon relay Ftr, provided it is connected to ground at the side remote from the anode of the tube, operates and remains operated until said ground is disconnected.

When the wipers of the sequence switch have stepped to position 7, as described, wiper PM*f* is biased at −5 v. whereas wiper PM*e* is connected, via conductor *d*2, make contact Dh1 (Fig. 5A), conductor *d*1, through Fig. 7 to conductor *d*, make contacts A6 and B1 (Fig. 2), conductor 7, wiper II (Fig. 3), bank terminal and conductor L4, resistor *r* in the wanted subscriber line circuit (Fig. 1), to ground.

The value of the resistance *r* varies in accordance with the type of line, for example as follows:

19,000 w. for an individual line or an intermediate line of a P. B. X group; 4,300 w. for a first line of a P. B. X group; 1,000 w. for a last line of a P. B. X group.

All these resistance values are, however, very small in comparison with the 500,000 w. resistance connected to −48 v. at wiper PM*e* and therefore, whatever the type of line, so long as it is free, that is, so long as no other potential has been applied to conductor L4 thereof by another final selector or a line finder (as is here assumed), the potential on wiper PM*e* will be more positive than −5 v., the potential at wiper PM*f*; the device VCD therefore immediately reacts, causing the ionization of tube SV3 and the operation of relay F*tr*. At make contact F*t*1, a circuit is closed for relay S*fr* via wiper PM*b* in position 7; relay S*fr* operates and locks via its make contact S*f*9 to ground. At make contact S*f*7, a circuit is closed for magnet PM, via wiper PM*d*, and the wipers of the sequence switch step to position 8 in the manner already described. During the momentary opening of break contact P*k*2, relay F*tr* is deprived of current and restores and tube SV3 deionizes.

At make contact S*f*2, a potential of −48 v. is applied through a resistance of 1,000 w. to conductor *d*2, depressing the potential thereon and on wiper PM*e* to at least −24 v.

The following table shows the values of the potentials appearing on wiper PM*e* when the different kinds of lines are tested and in three different conditions, namely, when the line is free and make contact S*f*2 is open, when it is free and contact S*f*2 is closed to connect −48 v. through a 1,000 w. resistance to conductor *d*2, and when the line is busy by reason of the connection of −48 v. through a 5,700 w. resistance to conductor *d*2, as will be explained:

| Kind of Line | Value of *r* | Potential at Wiper PM*e* | | |
|---|---|---|---|---|
| | | Line Free | Line Free, S*f*2 closed | Line Busy |
| Individual | 19,000 w. | <−5 v. | −45.6 v. | −36.9 v. |
| First P. B. X | 4,300 w. | <−5 v. | −39 v. | −20.6 v. |
| Intermediate P. B. X | 19,000 w. | <−5 v. | −45.6 v. | −36.9 v. |
| Last P. B. X | 1,000 w. | <−5 v. | −24 v. | −7.2 v. |

Wiper PM*f* being again biased at −5 v. in position 8, and the potential on wiper PM*e* being at least as negative as −24 v., the device VCD does not again react, relay F*tr* remains unoperated and a circuit is closed for relay S*br*, via break contact A*s*9, make contact S*f*3, wiper PM*a* in position 8, break contacts P*k*4 and F*t*1, to ground; relay S*br* operates.

The operation of relays S*fr* and S*br* together is an indication that the connection may be extended through the final selector (Fig. 2) to the wanted subscriber line. This action is prepared by the operation of the actuating magnet H of the final selector, which is now energized in a circuit via make contact B3, (Fig. 2), conductor *c*, through Fig. 7, conductor *c*1, make contacts S*f*6 and S*b*1 (Fig. 5A), to ground. Magnet H, upon operating, locks via its make contact H1 to ground on conductor *e*, and at its make contact H2 it energizes power magnet P2 (Fig. 3), in a circuit via conductor 9, make contacts H2 and B2, to ground.

The manner in which power magnet H prepares, and power magnet P2 completes, the "switching through" operation of the final selector is fully described in the above-mentioned British Patent No. 661,884. Briefly, magnet H having selected the set of contact springs A, B, C, D, E, from amongst the plurality of such sets included in the multi-switch, by sliding the ring-shaped member associated with said springs into its first operating position, and the carriage of the multi-switch having selected by its rotation the actuating finger appropriate to the wanted subscriber line, power magnet P2 by means of a rotating cam forces said contact springs into electrical contact with the respective multiple conductors L1—L5 of said line. When these connections have been effected, another cam, controlled by said magnet P2, slides the ring-shaped member into its second operating position, leaving said contact springs locked in their operated positions under the sole control of magnet H; thereafter the contact RI opens.

At contact springs A and B, conductors *a* and *b* are extended to the line conductors of the wanted subscriber line; at contact spring C, battery is connected to conductor L2 of the subscriber line in order to balance said line with respect to ground; and, at contact spring D, conductor L4 is connected to conductor *d* and thence through selectors PGS and GS (Fig. 7) to the link circuit, where the subscriber line will be "made busy," as will be explained.

In the meantime, at the operation of contact RI (Fig. 2), the circuit for relays B*r* and A*r* is opened and these relays restore, opening all connections between the final selector and the common control circuit (Fig. 3); power magnet P2 in the latter is de-energized and relay C*r* restores; by the removal of the low-resistance ground from common point 2, when make contact B4 (Fig. 2) opens, the D. C. potential at this point is allowed to rise again, indicating to other registers connected to the common control circuit and ready to carry out line-testing operations that the momentary period of their exclusion has terminated.

The register, having completed the setting of the final selector, removes ground from conductor *f*1, by means not shown, thereby releasing relay R*cr* (Fig. 7). At make contacts R*c*1—R*c*5, the 5-wire connection from the register to the final selector is opened; at break contact R*c*5, ground is connected through selectors GS and PGS to conductor *e* to hold magnet H in the final selector; finally, at break contact R*c*4, −48 v. battery is connected through a resistance of 5,700 w., via selectors GS and PGS, to conductor *d*, whence it is extended, via contact spring D (Fig. 2), to multiple conductor L4 of the connected subscriber line and, by modifying the ground potential previously existing thereon, "makes busy" that line.

The subsequent operations, of connecting the calling subscriber line to the wanted subscriber line in the link L (Fig. 7), of impressing ringing current on the latter line, and of disconnecting and releasing the register, may be carried out in any well-known manner and will not be further described.

Another example will now be described in order to demonstrate various other features of the invention. It is supposed that four calls are being directed concurrently by four registers to one and the same subscriber line number, which is the number of the first line of a "P. B. X group" comprising three lines, namely a first line, an intermediate line and a last line, all of which are free at the moment under consideration. It is also supposed that the four registers have selected four final selectors, included in one and the same multi-switch, and have jointly and concurrently controlled the "tens" and "units" settings of the carriage of the multi-switch, in cooperation with the one common control circuit which is associated therewith and to which said registers have all become connected, in the manner previously described; that wiper III of the multi-switch is now standing on the terminal of the first line of the wanted P. B. X group; and that all four registers are accordingly ready to carry out line-testing operations upon said line. It will be shown that three of the four registers will complete connections to the three lines of the group and that the fourth register will find all lines busy and complete no connection, in the following manner.

All four registers will attempt to obtain momentary exclusive use of the common control circuit for the purpose of their line-testing operations; one only will be successful and the remainder will be excluded and will wait, though remaining connected to the common control circuit; the successful register will test the condition of the first line of the group and, finding it free, will extend the connection thereto, make it busy and disconnect itself from the common control circuit, thereby terminating the exclusion period.

The three remaining registers will now attempt to obtain exclusive use of the common control circuit in the same manner; one register will be successful and the remainder will again be excluded; the second register will test the condition and class of the first line of the group, on the terminal of which wiper III is still standing, will find it not only busy but the first line of a P. B. X group, will cause wiper III to advance to the terminal of the second line of the group, will test the latter and, finding it free, will extend the second connection thereto, make it busy, and terminate the second exclusion period. During the line-testing operations carried out by the second register, the common control circuit will modify the potential on conductor L4 of the second line of the group in such a way that, as soon as said line is made busy, said conductor will display the characteristics of a busy first P. B. X line although it is, of course, an intermediate P. B. X line. This is an important feature of the invention.

The two remaining registers will now carry out a similar contest for priority and one will momentarily exclude the other once more from use of the common control circuit; the successful third register will test the condition and class of the second line of the group, on the terminal of which wiper III is still standing, will find it not only busy but having the characteristics of a first P. B. X line, will therefore cause wiper III to advance again to the terminal of the last line of the group, will test the latter and, finding it free, will extend the third connection thereto, make it busy, and terminate the third exclusion period.

Finally, the one remaining register will secure use of the common control circuit, will test the condition and class of the third line of the group, will find it both busy and the last line of a P. B. X group, will accordingly break down the connection which it has previously established through selectors GS and PGS to the final selector and the common control circuit, and will transmit a "line busy" indication to the link L.

It is to be noted that throughout the above operations the common control circuit has not been released until it has jointly and concurrently been controlled by, and has completely served in succession, all four registers.

The above operations will now be considered in greater detail. Wiper III (Fig. 3) having been directed to the terminal of the first line of the P. B. X group in the manner previously described, the four registers attempting to direct connections thereto are ready to perform line-testing operations thereon.

All four registers will now try to secure exclusive use of the common control circuit, in the manner previously described, by means of their relays D*tr* and D*hr*, (Fig. 5A), but only one of these registers, for example, register #1, will be successful and will then be able to test the first line of the P. B. X group for its free or busy condition, by means of the device VCD (Fig. 5B) in position 7 of the sequence switch. The fact that relays S*br* and S*fr* operate in register #1 is an indication that the line is free and the switching through will then occur for the final selector controlled by register #1 in the manner previously described.

From this moment, the first call is switched through and the first P. B. X line is made busy. Since the other three final selectors, controlled by the other three registers are in the condition where their relays A*r* and B*r* are already energized, relay C*r* in the common control circuit will not be able to restore, since immediately after the connection between relay D*hr* in its first register (Fig. 5A) and common point 2 (Fig. 3) has been opened at make contact B4 of the first final selector (Fig. 2), the remaining three registers will again find a "free" potential at point 2 and will, therefore, carry out a new mutual priority check. Again, one of these three registers, for example, register #2, will be successful and will therefore hold relay C*r* operated while operating its D*hr* relay. A shunt resistor across the winding of C*r* is used to make it slow-to-release, whereby it does not restore during the transition from register #1 to register #2.

Now, the second register will find wiper III (Fig. 3) standing on the first P. B. X line, which is now a busy line. Due to the closure of make contact D*h*4 (Fig. 5*A*), switch PM in register #2 will be brought into position 7 but as the tested line is a busy line, the first connection which is now established with this line will have caused the connection of —48 v. through a resistor of 5700 w. on conductor *d* of the first final selector. As shown in the table, this means that the potential found at wiper II will only be $$-\frac{48r}{r+5700}\text{ volts}$$

or —20.6 v. for a busy first P. B. X line, since in that case the value of resistance *r* is 4300 w.; accordingly, the device VCD (Fig. 5B) will not react and relay F*tr* and consequently relay S*fr* will remain unoperated, indicating that the line is not free. Magnet PM, however, receives current via wiper PM*a* in position 7 and break contacts F*t*1 and P*k*4, and the wipers therefore make one step and reach position 8, in the manner already described.

In position 8, wiper PM*f* will be again biassed to —5 volts and the device VCD will again fail to react since a potential of —20.6 v. is still present on wiper PM*e*. Again, magnet PM will receive current via break contact S*f*3, wiper PM*a* in position 8, and break contact P*k*4 and F*t*1, and the wipers therefore make one step and reach position 9.

In position 9, the device VCD is not used, and since relay A*sr*, which is used for another purpose, has obviously not become operated in position 8, magnet PM will be energized again via wiper PM*d* and break contacts A*s*3 and P*k*3. The wipers will accordingly make another step and reach position 10.

In position 10, wiper PM*f* is biassed to —17.4 v. and as this is more positive than the potential of —20.6 v. characterizing the busy first P. B. X line, the device VCD again fails to react; via wiper PM*a*, in the manner already described, the magnet PM is energized and the wipers of the sequence switch reach position 11.

In position 11, wiper PM*f* is biassed to —34.2 v. and as this is more negative than —20.6 v., the device VCD will react and relay F*tr* will operate, causing the operation of relay P*br* via make contact F*t*1 and wiper PM*b* in position 11. Relay P*br* locks via make contact P*b* 5 to ground.

The operation of relay P*br*, relay S*fr* being still unoperated, is thus an indication that the tested line is a first P. B. X line which is busy (—20.6 v.), since an intermediate P. B. X line which is busy has a potential of —36.9 v., which is more negative than —34.2 v. and would not have caused the operation of relay P*br*.

It is to be noted that a last P. B. X line which is busy would have had a potential of —7.2 v., which is less negative than —17.4 v. and would therefore have caused the operation of relay S*br* in position 10, preventing an advance of the sequence switch out of this position, as will be explained hereafter, whereas had the line been free relay S*fr* would have operated in position 7 as in the case of register #1.

It is necessary, therefore, to search for a free line in the P. B. X group of which the line just tested is the first line; to this end, the operation of the circuit proceeds as follows:

With relay P*br* operated, magnet PM is energized, via wiper PM*d* in position 11, make contact P*b*2 and break contact P*k*3, and the wipers of the sequence switch reach position 12.

In position 12, device VCD will again react, since wiper PM*f* is biassed at —46.1 v. which is more negative than the —20.6 v. on wiper PM*e*; however, the consequent operation of relay F*tr* at this stage has no effect and the wipers of the sequence switch will move to position 13, magnet PM being energized via wiper PM*d*, since make contact P*b*2 is still closed.

In position 13, it is wiper PM*e* which is biassed and this time to —43 v., whereas the potential of —20.6 v. on conductor *d*2 is offered to wiper PM*f*. The device VCD will therefore fail to react and the wipers will move to position 14, magnet PM being energized via wiper PM*a*, since make contact P*b*3 is closed.

In position 14, the device VCD is not used and the wipers will move to position 15, magnet PM being this time controlled via wiper PM*d*, since break contacts D*l*3 and C*n*3 are closed.

In position 15, wiper PM*f* is again biassed to —17.4 v. and the device VCD will fail to react, as before, in position 10. There being now no circuit for magnet PM, the wipers will remain in position 15. Since relay F*tr* is not operated, relay P*hr*, connected to the terminal on which wiper PM*b* is standing, also fails to operate.

Instead, relay *Xar* operates via break contacts S*f*4, P*h*1, make contact P*b*1, wiper PM*a* in position 15 and break contacts P*k*4 and F*t*1. Break contact X*a*1 (Fig. 5A) opens and both relay T*sr* in the common control circuit (Fig. 3), and relay W*pr* in the register (Fig. 5A) restore. Make contact W*p*1 is ineffective at this stage because make contact D*h*3 is closed, break contact W*p*1 because break contact D*h*5 is open, break contact W*p*2 because make contact D*h*2 is closed, and break contact W*p*3 because break contact D*h*3 is open.

It is to be noted that relay T*sr* in the common control circuit can release at this time, since the third and fourth registers, which have not yet succeeded in completing their connections and are in a waiting condition, cannot maintain it energized, their relays S*r* having restored and having opened their conductors *b*1, to which relay T*sr* was previously connected, as already explained.

The release of relay T*sr*, therefore, causes the release of relay D*r* and the power magnet P1 is energized again, driving wiper II off the terminal of the busy first P. B. X line.

At make contact XA1 (Fig. 5B), relay T*sr* is now connected to relay F*tr* (Fig. 5B) also in the unoperated condition via break contact P*h*5.

Wiper PM*f* is still biassed, in position 15, to a potential of —17.4 v.; accordingly, when wiper II encounters a more positive potential, the device VCD will react, causing the simultaneous operation of relays F*tr* and T*sr* in series. Since the second P. B. X line is assumed free, the device VCD will react as soon as wiper II reaches its terminal. However, it is to be noted that if this second line of the P. B. X group had instead been a busy last P. B. X line, the potential on conductor *d*1 would have been —7.2 v. and the device VCD would still have reacted. The register has not yet determined, therefore, whether or not the second line of the group is free.

On the one hand, the operation of relay T*sr* immediately stops the rotation of the carriage of the multi-switch by opening the circuit for power magnet P1, while on the other hand, the operation of relay F*tr* causes relay P*hr* to be energized via make contact F*t*1 and wiper PM*b* in position 15. Relay P*hr* locks via its make contact P*h*3 to ground. Also, at break contact F*t*1, the circuit for the slow-to-release relay X*ar* is opened and this relay restores after a short delay. Meanwhile, at make-before-break contact P*h*5, relay T*sr* is now directly held from the exchange battery through a resistor and as soon as break contact P*h*5 opens, relay F*tr* restores, since the ground through break contacts X*a*2 and P*k*2 will not be reconnected to this relay until the delayed release of relay X*ar* has taken place. The circuit for relay T*sr* is maintained, independently of make contact X*a*1, now open, by make contact P*h*6. Break contact X*a*1 is not again effective because tube SV2 is no longer ionized.

In the meantime, the operation of relay P*hr* also causes magnet PM to operate again, in a circuit via wiper PM*d*, make contact P*h*2 and break contact P*k*3, and the wipers of the sequence switch move to position 16.

In position 16, since wiper II has stopped on the terminal of the second P. B. X line, which is assumed to be free, the device VDC reacts again and relay F*tr* operates as soon as break contact X*a*2 closes, since wiper PM*f* is now biassed to —5 v. and the potential on wiper PM*e* is more positive. Therefore, the operation of relay F*tr* in position 16 clearly indicates that the tested line is a free line, since a busy last P. B. X line, which would have presented a potential of —7.2 v. on conductor *d*1, would not have caused the device VCD to react. The operation of relay F*tr* causes relay S*fr* to operate via make contact F*t*1 and wiper PM*b*. This relay locks via its make contact S*f*9 and also causes relay S*br* to operate via break contact A*s*9 and make contacts S*f*1 and P*h*4.

The fact that relays S*fr* and S*br* have both operated, indicates, as before, that "switching through" of the final selector can be effected; this takes place, in the manner already explained, when ground is connected to conductor *c*1 (Fig. 5A) via make contacts S*f*6 and S*b*1, and the second line of the P. B. X group is made busy. Upon the restoration of relay A*r* and B*r* in the final selector, which occurs as explained when contact RI (Fig. 2) opens, all connections between the final selector and the common control circuit are opened and the potential of the exchange battery again appears at common point 2.

It is here to be observed that, during the operations which have been described in regard to the connection of a final selector to the second P. B. X line under the control of register #2, another circuit change occurred in the common control circuit, which had no significance whatever in those operations but which becomes significant in the subsequent operations about to be described and constitutes an important feature of the present invention.

Thus, when wiper II of the multi-switch was about to move from the terminal of the first P. B. X line, found to be busy, to the second P. B. X line, relay D*r* in releasing caused the operation of relay E*r*, via make contact C1, and break contact D4. After the wiper had stopped on the terminal of the second P. B. X line, relay D*r* again operated, as stated, but relay E*r* remained energized, having locked via its make contact E2. In consequence, a potential of —20.2 v. was applied to wiper II, via make contacts E3, D2, and rectifier RE, poled as shown. This potential of —20.2 v. is obtained from the potentiometer comprising the resistors of 420 w. and 580 w. joined together by make contact E1. However, since the second P. B. X line was free at that moment, characterized by zero potential at wiper II, rectifier RE presented a high resistance and the connection of the potentiometer was ineffective to modify said zero potential appreciably.

Now, battery potential having appeared again at common point 2 (Fig. 3), as stated, the remaining two registers will once again carry out a mutual priority check. Again, one of these registers, for example register #3, will be successful and will therefore hold relay C*r* (Fig. 3) operated while operating its relay D*hr*. Register #3 will find wipers II and III standing on the terminals of the second P. B. X line, which is now a busy line.

However, although this line is an intermediate line of a P. B. X group and has, as can be seen from the aforementioned table, a potential of —36.9 v. on its conductor L4, the potential actually appearing on wiper II is —20.6 v., the characteristic potential of a busy first line of a P. B. X group.

This is due to the fact that the —20.2 v. potential which is applied in the common control circuit to wiper II via rectifier RE when make contact D2 is closed, can now be effectively impressed on that wiper since the potential on conductor L4 of the busy second P. B. X line is —36.9 v. and rectifier RE accordingly presents a low resistance. Hence, for all intents and purposes, the potential of —36.9 v. disappears and is replaced by a potential of —20.6 v., which corresponds to the potential of a first P. B. X line which is busy.

Hence, the busy second P. B. X line is treated as a busy first P. B. X line and the subsequent operations controlled by register #3 are exactly the same as those controlled by register #2, which means that the wipers of the multi-switch will be directed to the terminals of the third P. B. X line, which will be found to be free and to which the third final selector will become connected, all as previously described.

It is to be noted that the potential of —20.2 v. obtained from the potentiometer, is only slightly modified (to —20.6 v) when impressed on wiper II due to the fact that the resistance values of the potentiometer sections are much lower than the values of the resistances from which the potential of —36.9 v., characteristic of an intermediate busy P. B. X line, is obtained.

It is also to be remarked that when wiper II of the multi-switch leaves the terminal of the second P. B. X line, relay Dr has already released and the potential of —20.6 v. is no longer applied to the wiper via rectifier RE. This is, however, of no consequence.

The third final selector, having become connected to the third and last line of the P. B. X group under the control of register #3, and this line having been made busy, all connections between said third final selector and the common control circuit are opened, in the manner already described.

Accordingly, upon the re-appearance of battery potential at common point 2 (Fig. 3), the fourth and last register immediately secures the use of the common control circuit and proceeds with its line-testing operations. The sequence switch in the register #4 proceeds to advance step by step and a series of tests is carried out in the various positions of this switch, in the manner already described. Since wiper II of the multi-switch is still standing on the terminals of a last P. B. X line, which is now busy, there is a potential of —7.2 v. thereon, as can be seen from the aforementioned table; this means that the device VCD will fail to react while the wipers of the sequence switch are in positions 7 and 8, as before.

In position 10, however, unlike the previous cases which have been described, the device VCD will react and the operation of relay Ftr will cause the operation of relay *Sbr* via make contact Ft1, wiper PM*b* in position 10 and break contact A*s*9, and magnet PM will not find a circuit for the further advance of the wipers. The line testing need obviously not be continued beyond position 10 of the sequence switch, since at that moment, the potential on conductor L4 of the tested line has been determined as being between —5 v. and —17.4 v., which can only means that the line is the last line of a P. B. X group and that this line is busy like the rest of the group.

The fact that relay *Sbr* is now operated and relay *Sfr* is unoperated is an indication to register #4 that the desired connection, to a line in the P. B. X group whose number it, like the more successful registers #1, #2 and #3, has received, must be denied. Register #4 will, therefore, by means not shown in the drawings, break down the connection which it has established through the train of switches GS and PGS (Fig. 7) to the final selector, releasing these selectors and the common control circuit, will transmit a "line busy" indication of any suitable nature to link L (Fig. 7), and will finally disconnect itself therefrom and restore to normal.

In the foregoing description, it will have been noted that register #3, having tested the potential appearing on wiper II, then standing on the terminal of a busy intermediate P. B. X line (although the register had received and stored the number of the first line of the group), and having found thereon the potential characteristic of a busy first P. B. X line, caused the carriage of the multi-switch to advance its wipers to the terminals of another line. This action was due, as explained, to the connection of the potentiometer to said wiper II in order to modify the potential thereon from —36.9 v. to —20.6 v.

Had the register, on the other hand, received the number of the said intermediate P. B. X line, rather than the number of the first line of the P. B. X group, relay Er (Fig. 3) would not have operated, relay Dr having no reason to restore after the operation of relay Cr, and the potentiometer would therefore not have become connected to wiper II. The register would accordingly have found a potential of —36.9 v. thereon, which would have failed to cause the reaction of device VCD and the operation of relay P*br*, when compared with a potential of —34.2 v. in position 11 of the sequence switch, but which would have caused instead the reaction of said device and the operation of relay *Sbr* when compared with —46.1 v. in position 12. With relay *Sbr* operated and *Sfr* unoperated, the register would have broken down the connection and transmitted a "line busy" indication to link L, as in the case of register #4 already described.

It will now be described how the common control circuit shown in Fig. 3 can also be used to control the setting of a line finder such as that shown in Fig. 1, under the direction of a register, part of which is shown in Fig. 4. In this part of the register, the elements have been shown to be different from the elements used in that part of the register which is used for controlling the setting of a final selector, and which has been shown in Figs. 5A and 5B, but it will be evident that some of the elements are similar and they might readily be made to perform dual functions. For a proper understanding of the circuits involved in the setting of a line finder, Figs. 1, 2, 3, 4, and 6 should be juxtaposed as indicated in Fig. 8.

It is to be understood that, prior to the operations now to be described, a calling subscriber at station S (Fig. 1) has originated a call by closing a metallic loop across his line conductors L1, L2, which loop, by changing the D. C. potential on conductor L3 from —48 v. to approximately —24 v., has caused call-detecting means in a line finder starting circuit FSC, connected to said conductor L3, to assign a register, such as that shown in Fig. 4, to handle the desired connection; and that said register has become connected, through a register connecting switch RCS (Fig. 6), to a second line finder 2LF and has set said second line finder upon conductors *a'*, *b'*, *c'*, *d'*, *e'*, leading to a first line finder such as that shown in Fig. 1, which has access via spring contacts A', B', C', D', E', comprising one individual switch of a multiswitch, to the calling line.

A system for performing the above-mentioned operations is disclosed and fully described in U. S. Patent No. 2,597,007, issued on May 20, 1952, and also in my Dutch Patent No. 67,474, issued March 15, 1951, and will not be further described herein.

When, therefore, the register is ready to set the line finder (Fig. 1) upon the terminals of the calling line, make contact "A" (Fig. 4) closes, by means not shown, thereby extending ground, via break contact T*dl*, conductor *a*1, through switch RCS and line finder 2LF (Fig. 6), to conductor *a'* (Fig. 1).

It will be noted that the line finder circuit is similar to the final selector circuit (Fig. 2); when ground appears on conductor *a'*, relay A*r* operates and locks via relay B*r*, make contact A5, break contact RI, conductor *e'*, through Fig. 6, conductor *e*1, to ground in the register. At make contact A2, a circuit is closed for power magnet P1 in the common control circuit (Fig. 3), via break contacts Tf1, Ts1 and D3 and the carriage of the multi-switch starts to rotate. The test for a calling line is made on conductor L3 thereof which, as shown in Fig. 1, and as previously stated, is normally connected to a potential of —48 v. through a 30,000 w. resistance, but its potential becomes approximately —24 v. when the subscriber line is looped. As wiper I (Fig. 3) passes over the terminals of the lines connected to the multi-switch, the potentials on their conductors L3 are conveyed to wiper QMe of the sequence switch in the register (Fig. 4), now standing in position 1, via conductor 8, make contact A1 (Fig. 1), conductor c', through Fig. 6, and conductor c1; so long as the potential is —48 v., the voltage comparing device VCD will not react, since its wiper QMf is biassed to —37 v. in position 1. However, when wiper I encounters the terminal of a calling line, the potential on conductor L3 is —24 v. and the device VCD reacts, causing the operation of relays Gtr (Fig. 4) and Tfr (Fig. 3) in series, in a circuit via break contact Td5 and Td4, conductor b1, through Fig. 6, conductor b', make contact A3 (Fig. 1), and conductor 4 (Fig. 3).

It is to be noted that the conductors L3 of busy lines also have a potential of —48 v. and are equally ignored by the device VCD as wiper I passes them.

Upon the operation of Gtr, magnet QM of the sequence switch is energized in a circuit via wiper QMb in position 1 and make contact Gr1; magnet QM energizes relay Qkr.

Meanwhile, the operation of relay Tfr immediately stops the rotation of the carriage, by opening the circuit for power magnet P1 at break contact Tf1, and also energizes relays Fr and Dr in series, via make contact Tf1. Upon the operation of relay Fr, a test potential is applied to common point 5 through the winding of relay Gr and make contact F1.

The register now proceeds to check this potential by presenting thereto ground through the high-resistance winding of relay Etr via break contact Td2, conductor d1, through Fig. 6, conductor d', make contact A6, break contact B1 and conductor 5. If the register is successful in its double test, with respect to other registers which might try to obtain access to the calling line, relay Ehr will operate in series with the low-resistance winding of relay Etr, to ground at make contact Et1. At this moment, since relay Ehr is also a low-resistance relay, relay Gr in the common control circuit is also energized and operates, locking independently of contact F1 at its make contact G1.

The operation of relay Ehr results in the operation of relay Tdr (Fig. 4), and this relay locks via make contact Td3. At make-before-break contact Td4, relay Tfr (Fig. 3) is now made to hold to the exchange battery through a resistance and relay Gtr restores, being now connected to the open break contact Qk2. At make contact Td1, ground is disconnected from conductor a1; relay Br (Fig. 1) is then no longer short-circuited and operates in series with relay Ar. Relay Gtr having restored, magnet QM restores and the wipers of the sequence switch move to position 2. Relay Qkr restores and recloses ground to relay Gtr at break contact Qk2. When break contact Td2 opens, relays Etr and Ehr restore, but have no effect.

In position 2 of the sequence switch, a test is carried out for lines with limited services, in which a rectifier is inserted in conductor L3 (this case is not illustrated). Assuming that the calling line is not of this type, and since zero volts is the reference potential at wiper QMe in position 2, whereas the potential on wiper QMF is still approximately —24 v., the device VCD reacts again and relay Gtr operates, energizing magnet QM at make contact Gt1 via wiper QMb. Relay Qkr operates and opens the circuit for magnet QM, whereupon the wipers move to position 3, releasing relay Qkr.

In position 3, a test is again made to verify the persistence of the call, with a potential of —37 v. on wiper QMf and, this test being successful, the sequence switch again makes one step in the manner previously described and the wipers reach position 4.

In position 4, a test is made on conductor L4 of the calling line. This is made in order to ascertain that the line has not been seized in the meantime by a final selector. If this is the case, as is assumed, ground potential through resistor r (Fig. 1) will still be present on conductor L4 and this potential will, therefore, be impressed on wiper QMe via make contact Td2, conductor d1, through Fig. 6, conductor d', make contacts A6, B1 (Fig. 1), conductor 7 and wiper II (Fig. 3). Since wiper QMf is biassed to —5 volts, the device VCD will therefore react upon finding that the calling line has not been seized by a final selector and made busy, in which case the potential on its conductor L4 would have become at least as negative as —7.2 v. Relay Gtr operates and energizes relay Psr through contact Gt1 and wiper QMb in position 4. Relay Psr locks via make contact Ps2. At make contact Ps3, a circuit is closed for magnet QM and the wipers accordingly move to position 5; relay Gtr restores when break contact Qk2 opens.

In position 5, the device VCD will not react and relay Ftr will remain unoperated. This is due to the fact that a potential more positive than —5 v. is necessary at wiper QMe, since wiper QMf is biassed to —5 v., whereas, upon the operation of relay Psr a potential of —48 v. through a resistance of 1000 w. has been applied to wiper QMe, via make contact Ps1. This means that, even if the line is free, as is assumed, the potential at conductor L4 will no longer be zero but will have fallen at at least —24 v. as previously explained.

Since the device VCD does not react, relay Ltr operates via break contacts Gt1, Qk1, and wiper QMa in position 5, and locks to ground at make contact Lt3. Thereupon, magnet QM is energized, via make contact Lt1 and wiper QMd, and the wipers move to position 6, whereafter the sequence switch may be used for other purposes.

The operation of relay Ltr causes ground to be applied via make contacts Lt2, Td1, conductor a1, through Fig. 6, conductor a', make contact B4 (Fig. 1) to the actuating and holding magnet H of the line finder. This magnet locks via make contact H1 to ground on conductor e' and also energizes power magnet P2 of the multi-switch (Fig. 3), via make contacts B2, H2 and conductor 9. The operations for "switching through" the line finder are thus identical with those already described for switching through a final selector and, when they have been completed and contact RI has opened, relays Ar and Br restore, opening all connections between the line finder and the common control circuit.

If a subscriber line becomes a calling line at a moment when one or more final selectors are hunting for it, break contact G2 inserted in the path to the test potential provided in the common control circuit at common point 2 for the final selectors, assures preference to the line finder which will be hunting for the calling line, since relay Gr operates as soon as the register controlling said line finder is ready to switch it through, whether or not another register controlling a final selector has operated relay Cr, preparatory to its line-testing operations.

The above-mentioned preference arrangement ensures also that in case the carriage is stopped on behalf of both a line finder and a final selector, only one of these switches can become connected to the line in question.

The present invention is not restricted to the described embodiment, but numerous modifications may be applied within the scope of the invention. For example, instead of using characteristic A. C. potentials for controlling the selector settings, use may be made of D. C. potentials, for example in the manner described in U. S. Patent No. 2,354,682, issued August 1, 1944. Instead of using a static device of the kind described in my above-mentioned U. S. Patent No. 2,593,418, and also in U. S. Patent No. 2,588,357, issued on March 11, 1952, other suitable devices may be applied. In addition to the described type of multi-switch, the invention may also be applied to other types in which a common switch circuit is used for simultaneously or concurrently setting one or more individual switches. The circuit arrangement shown in the drawings is, therefore, in no way limitative.

I claim:

1. In a telecommunication switching system, a plurality of subscriber lines each comprising line conductors and a test conductor, means for impressing a signal upon the test conductor of one of said subscriber lines placed in the calling condition, a multi-switch comprising a plurality of individual switches and a common controlling mechanism therefor, said individual switches each comprising input conductors and a plurality of contact sets for connecting said input conductors severally to the line conductors of each of said subscriber lines, a register-controller, means for connecting said register-controller to one of said individual switches and to said common controlling mechanism, said mechanism comprising a control conductor, contacting means for connecting said control conductors to the test conductor of any one of said lines and selecting means controlled by said register-controller for actuating said contacting means to connect said control conductor to the test conductor of said one line and for selecting one contact set of said one individual switch for actuation to connect the input conductors thereof to the line conductors of said one line, detecting means in said register-controller connected to said control conductor and responsive to said signal, and actuating means controlled by said detecting means for actuating said one contact set.

2. In a telecommunication switching system, the combination, as claimed in claim 1, and in which said one individual switch further comprises conditioning means controlled by said register-controller for conditioning for actuation by said actuating means the contact set selected by said selecting means, and said actuating means is comprised in said common controlling mechanism.

3. In a telecommunication switching system, the combination, as claimed in claim 1, and further comprising holding means in said individual switch for maintaining actuated said contact set independently of said actuating means.

4. In a telecommunication switching system, the combination, as claimed in claim 1, and further comprising a second test conductor for each of said subscriber lines, means for impressing upon each of said second test conductors a discriminating signal indicative of the state of availability and the class of the line, a second control conductor in said common controlling mechanism, additional contacting means actuated by said selecting means for connecting said second control conductor to the second test conductor of said one line, and testing means in said register-controller connected to said second control conductor and responsive to the discriminating signal impressed on said second test conductor for determining the state of availability and the class of said one line.

5. In a telecommunication switching system, subscriber lines each comprising line conductors and a test conductor, means for impressing signals upon the test conductors of each of a plurality of said lines placed in the calling condition, a multi-switch comprising a plurality of individual switches and a common controlling mechanism therefor, said individual switches each comprising input conductors and a plurality of contact sets for connecting said input conductors severally to the line conductors of each of said subscriber lines, a plurality of register-controllers, means for concurrently connecting said register-controllers each to one of said individual switches and to said common controlling mechanism, said mechanism comprising a control conductor, contacting means for connecting said control conductor to the test conductor of any one of said lines and selecting means controlled jointly by said register-controllers for actuating said contact means to connect said control conductor to the test conductor of one of said plurality of lines and for selecting one contact set of each of the corresponding individual switches for actuation to connect the input conductors thereof to the line conductors of said one line, detecting means in each of said register-controllers connected to said control conductor and responsive to the signal impressed on said one line, mutual interference means in each of said register-controllers for enabling the detecting means in one only of said register-controllers, and actuating means controlled by said enabled detecting means for actuating the selected contact set of the corresponding individual switch.

6. In a telecommunication switching system, the combination, as claimed in claim 5, and further comprising means controlled by said actuated contact set for removing the signal impressed on said one line, and means for thereafter disconnecting from said common controlling mechanism the register-controller comprising said enabled detecting means, whereby said selecting means may be further controlled by another of said register-controllers for selecting a contact set of the individual switch corresponding thereto.

7. In a telecommunication switching system, the combination, as claimed in claim 5, and in which said mutual interference means comprises a relay in each of said register-controllers connected in parallel to a test potential through a common resistor associated with said common control mechanism and so adjusted that only one can be operated at a time, and contacts on said one relay for enabling said detecting means.

8. In a telecommunication switching system, a plurality of subscriber lines each comprising line conductors and a test conductor, a multi-switch comprising a plurality of individual switches and a common controlling mechanism therefor, said individual switches each comprising input conductors and a plurality of contact sets, for connecting said input conductors severally to the line conductors of each of said subscriber lines, a register-controller, means for connecting said register-controller to one of said individual switches and to said common controlling mechanism upon the initiation of a call upon one of said lines, said mechanism comprising a control conductor, contacting means for connecting said control conductor to the test conductor of any one of said lines and selecting means controlled by said register-controller for actuating said contacting means to connect said control conductor to the test conductor of said one line and for selecting one contact set of said one individual switch for actuation to connect the input conductors thereof to the line conductors of said one line, means for impressing upon the test conductor of each of said lines a discriminating signal indicative of the state of availability thereof, testing means in said register-controller connected to said control conductor for determining the state of availability of said one line, and actuating means controlled by said testing means for actuating said one contact set.

9. In a telecommunication switching system, a plurality of subscriber lines each comprising line conductors and a test conductor, a multi-switch comprising a plurality of individual switches assigned as primary finders for connecting to calling ones of said lines, a plurality of individual switches assigned as final selectors for connecting to called ones of said lines, a common controlling mechanism for all said individual switches, said individual switches each comprising input conductors and a plurality of contact sets, for connecting said input conductors severally to the line conductors of each of said subscriber lines, first and second register-controllers each comprising testing means, means for connecting said first register-controller to one of said individual switches assigned as primary finders for extending a connection to the line conductors of a calling one of said lines upon the initiation of a call thereon, means for connecting said second register-controller to one of said individual switches assigned as final selectors for extending a connection to the line conductors of a called one of said lines, means for connecting both said register-controllers to said mechanism, whereby both register-controllers exercise control thereover concurrently, said mechanism comprising a control conductor, contacting means for connecting said control conductor to the test conductor of any one of said lines and selecting means controlled by one of said register-controllers for actuating said contacting means to connect said control conductor to the test conductor of the corresponding one of said calling and called lines and for selecting one of said contact sets for actuation, means, including the testing means in said one register-controller, said control conductor and the test conductor of said one line, for ascertaining the state of availability thereof, actuating means in said mechanism controlled by said testing means for actuating said contact set, and interference means associated with said mechanism and controlled by said one register-controller for temporarily disabling the control exercised by the other of said register-controllers over said mechanism while said testing and actuating operations are taking place.

10. In a telecommunication switching system, the combination, as claimed in claim 9, and further comprising priority means associated with said mechanism, operative in the event that said calling and called lines are one and the same line, for temporarily disabling the control exercised by said second register-controller over said mechanism while the testing and actuating operations controlled by said first register-controller are taking place.

11. In a telecommunication switching system, the combination, as claimed in claim 10, and in which said priority means comprises a relay included in the connection between said first register-controller and said mechanism and not included in the connection between said second register-controller and said mechanism, and contacts of said relay for disabling the testing means in said second register-controller.

12. In a telecommunication switching system, a plurality of subscriber lines grouped under one call number and consisting of a first choice line, intermediate choice lines and a last choice line and each comprising line conductors and a test conductor, a multi-switch comprising a plurality of individual switches each comprising a plurality of contact sets for extending a connection to the conductors of each of said lines and a common controlling mechanism therefor, a register-controller comprising means for receiving call numbers, means for connecting said register-controller to one of said individual switches and to said common controller mechanism, said mechanism comprising a control conductor and contacting means for connecting said control conductor to the test conductor of any one of said lines, means in said register-controller, effective upon the receipt therein of said common call number, for controlling said contacting means to connect said control conductor to the test conductor of said first choice line, means for impressing upon the test conductor of each of said lines a discriminating signal indicative of its state of availability and its order of choice, testing means in said register-controller connected to said control conductor for ascertaining the state of availability and order of choice of the line to which said control conductor is connected, means controlled by said testing means, in the event that said first choice line is engaged, for shifting said contacting means to connect said control conductor to the test conductor of one of said intermediate choice lines, and means controlled by said testing means, in the event that said intermediate choice line is also engaged, for replacing the signal impressed on the test conductor thereof indicative of an engaged intermediate choice line by a signal indicative of an engaged first choice line.

References Cited in the file of this patent

UNITED STATES PATENTS 2,485,351 Bellamy ............... Oct. 18, 1949